United States Patent
Beaumont

(12) 
(10) Patent No.: US 6,717,094 B2
(45) Date of Patent: Apr. 6, 2004

(54) ELECTRICAL DISCHARGE MACHINE AND METHODS OF ESTABLISHING ZERO SET CONDITIONS FOR OPERATION THEREOF

(76) Inventor: Edward L. Beaumont, 17195-0 Bloomrose Rd., Williamsburg, OH (US) 45176

( * ) Notice: Subject to any disclaimer, the term of this patent is extended or adjusted under 35 U.S.C. 154(b) by 0 days.

(21) Appl. No.: 10/201,176

(22) Filed: Jul. 22, 2002

(65) Prior Publication Data
US 2004/0011768 A1 Jan. 22, 2004

(51) Int. Cl.[7] .............................. B32H 1/10; B32H 7/18
(52) U.S. Cl. ............................... 219/69.14; 219/69.15; 219/69.16; 219/69.17
(58) Field of Search ........................... 219/69.17, 69.14, 219/69.15, 69.16, 69.2

(56) References Cited

U.S. PATENT DOCUMENTS

| | | |
|---|---|---|
| 2,718,581 A | 9/1955 | Thomas |
| 3,378,473 A | 4/1968 | Inoue |
| 3,594,536 A | 7/1971 | Holroyd |
| 3,642,601 A | 2/1972 | Kondo |
| 3,764,771 A | 10/1973 | Roy |
| 3,806,691 A * | 4/1974 | Roach ..................... 219/69.16 |
| 4,101,405 A | 7/1978 | Inoue |
| 4,152,569 A | 5/1979 | Bell, Jr. et al. |
| 4,208,256 A | 6/1980 | Inoue |
| 4,289,947 A | 9/1981 | Inoue |
| 4,306,135 A | 12/1981 | Bell, Jr. et al. |
| 4,321,451 A | 3/1982 | Inoue |
| 4,337,385 A * | 6/1982 | Maropis et al. ............ 219/69.2 |
| 4,361,745 A * | 11/1982 | Rupert et al. ............. 219/69.16 |
| 4,393,292 A | 7/1983 | Inoue |
| 4,409,458 A | 10/1983 | Inoue |
| 4,417,843 A | 11/1983 | Bonga |
| 4,453,070 A | 6/1984 | Bonga |
| 4,459,454 A | 7/1984 | Inoue |
| 4,460,816 A | 7/1984 | Bonga |
| 4,461,942 A | 7/1984 | Delpretti |
| 4,463,241 A | 7/1984 | Smith |
| 4,481,095 A | 11/1984 | Inoue |
| 4,510,365 A | 4/1985 | MacGregor et al. |
| 4,510,366 A | 4/1985 | Inoue |
| 4,513,192 A | 4/1985 | Inoue |
| 4,518,317 A | 5/1985 | Inoue |
| 4,521,660 A | 6/1985 | Inoue |
| 4,539,458 A | 9/1985 | Inoue |
| 4,575,603 A | 3/1986 | Inoue et al. |
| 4,607,149 A | 8/1986 | Inoue |
| 4,626,332 A | 12/1986 | Inoue |
| 4,628,170 A | 12/1986 | Furukawa |
| 4,629,854 A | 12/1986 | Inoue et al. |
| 4,644,125 A | 2/1987 | Check et al. |
| 4,705,932 A | 11/1987 | Aso et al. |
| 4,739,145 A | 4/1988 | Check et al. |
| 4,814,574 A | 3/1989 | Babel et al. |
| 4,922,074 A | 5/1990 | Sebzda, Sr. |
| 4,985,608 A | 1/1991 | Morishita et al. |
| 5,004,530 A | 4/1991 | Tanaka |

(List continued on next page.)

*Primary Examiner*—Geoffrey S. Evans
(74) *Attorney, Agent, or Firm*—Dinsmore & Shohl LLP

(57) ABSTRACT

Electrical discharge machines are disclosed that are capable of a relatively wide range of flexibility and range of motion for performing electrical discharge operations. The electrical discharge machine herein can optionally comprise up to, and in excess of six axes of motion to adjust the electrode relative to the workpiece. To effectively remove the swarf that is generated during electroerosion operations, a primary flushing system and an optional auxiliary flushing system are provided. The auxiliary flushing system is used to direct dielectric fluid towards the workpiece external to the electrode. Further, methods of performing high speed electrical discharge machining operations are disclosed, including methods for establishing the zero set conditions that indicate initiation of the electroerosion process based upon a detection of dither on the electrode travel.

35 Claims, 7 Drawing Sheets

U.S. PATENT DOCUMENTS

| | | | |
|---|---|---|---|
| 5,045,663 A | | 9/1991 | Neal et al. |
| 5,128,505 A | | 7/1992 | Matter |
| 5,166,490 A | | 11/1992 | Morishita et al. |
| 5,187,341 A | | 2/1993 | Graell |
| 5,189,276 A | | 2/1993 | Magara |
| 5,245,152 A | | 9/1993 | McCall |
| 5,281,788 A | | 1/1994 | Abiko et al. |
| 5,384,443 A | | 1/1995 | Swartzbaugh |
| 5,391,850 A | | 2/1995 | Mueller |
| 5,408,063 A | | 4/1995 | Onishi |
| 5,416,289 A | | 5/1995 | Tanaka |
| 5,434,381 A | | 7/1995 | Mitcheson |
| 5,444,204 A | | 8/1995 | Derighetti et al. |
| 5,523,953 A | | 6/1996 | Araie et al. |
| 5,585,013 A | | 12/1996 | Truty |
| 5,614,108 A | | 3/1997 | Habel et al. |
| 5,739,497 A | * | 4/1998 | Tanaka ...................... 219/69.2 |
| 5,786,557 A | | 7/1998 | Girardin |
| 5,847,348 A | | 12/1998 | Allison |
| 5,852,269 A | | 12/1998 | Toyonaga et al. |
| 5,861,608 A | | 1/1999 | Thompson |
| 5,911,888 A | | 6/1999 | Girardin |
| 5,922,221 A | | 7/1999 | Ui |
| 5,973,288 A | | 10/1999 | Marchesi et al. |
| 6,064,920 A | | 5/2000 | Monleone |
| 6,127,642 A | * | 10/2000 | Gleason et al. .......... 219/69.15 |
| 6,140,600 A | | 10/2000 | Kaneko et al. |
| 6,194,361 B1 | | 2/2001 | Gatlin |
| 6,225,589 B1 | | 5/2001 | Bartok |
| 6,229,110 B1 | | 5/2001 | Hosaka et al. |
| 6,326,579 B1 | * | 12/2001 | Krawczyk et al. ......... 219/69.2 |
| 6,576,858 B1 | * | 6/2003 | Yokomichi ................. 219/69.2 |

* cited by examiner

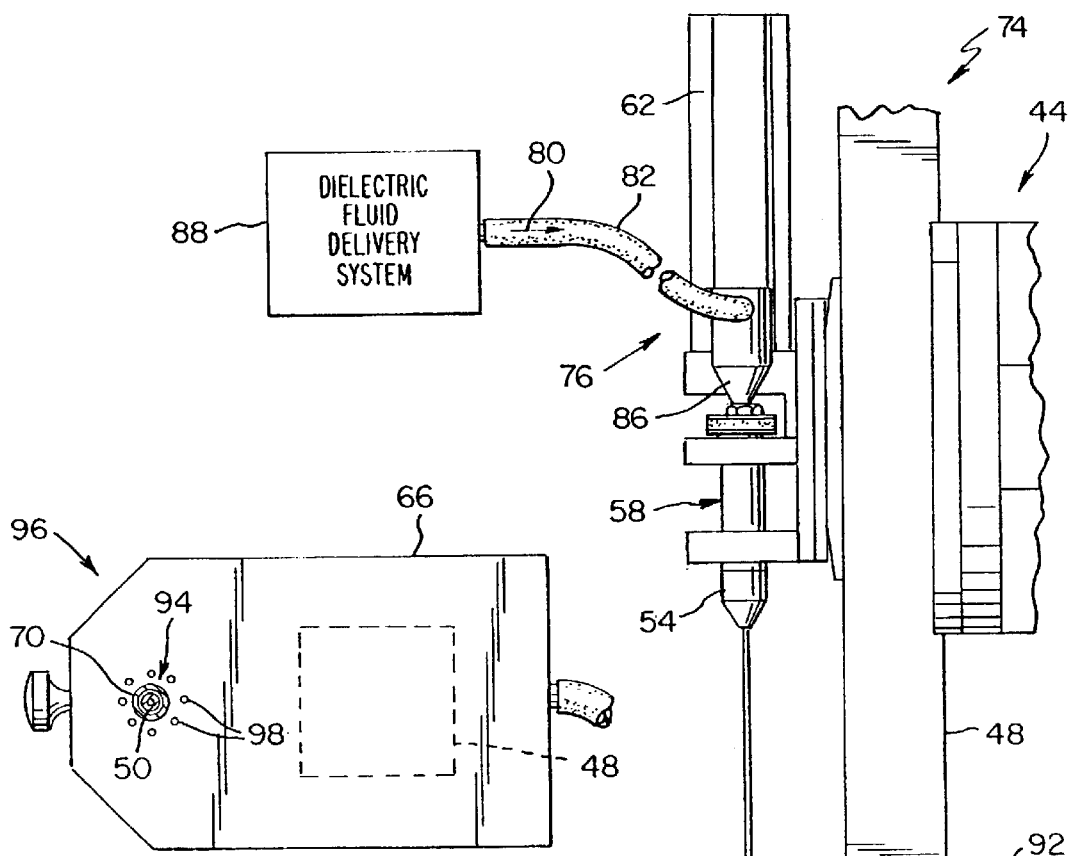
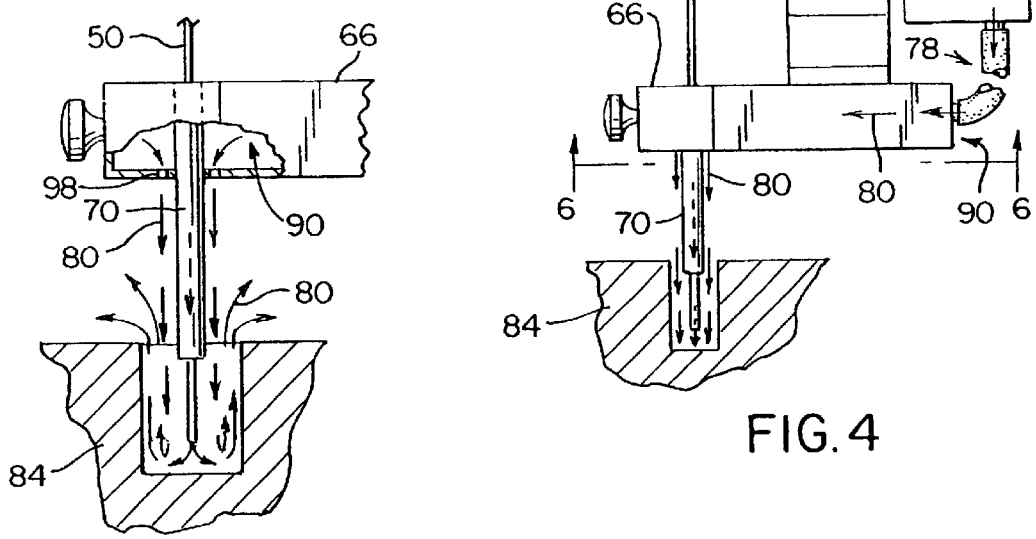
FIG.6
FIG.5
FIG.4

ELECTRICAL DISCHARGE MACHINE AND METHODS OF ESTABLISHING ZERO SET CONDITIONS FOR OPERATION THEREOF

BACKGROUND OF THE INVENTION

The present invention relates generally to electrical discharge machines and in particular to apparatuses and methods for performing high-speed, accurate, electric discharge machining operations. The present invention further relates to apparatuses, processes and methods for efficiently programming and operating electrical discharge machines.

An electrical discharge machine (EDM) utilizes a repetitious train of electroerosive sparks or discharges to machine an electrically charged workpiece. In operation, an electrode and the workpiece are brought into proximity with one another, and a dielectric fluid is introduced in the gap therebetween. Typically, the gap between the electrode and workpiece is on the order of approximately 0.1 millimeters to approximately 0.5 millimeters. A power supply connected between the electrode and the workpiece produces a controlled train of direct current (DC) voltage pulses. At a critical value of the applied voltage, the dielectric fluid between the electrode and the workpiece breaks down, and at least partially ionizes causing a series of sparks to be produced. Each spark vaporizes a small quantity of the workpiece creating a tiny pit or crater on the workpiece surface. In addition to assisting in the formation of the spark discharges, the dielectric fluid cools the workpiece during repeated spark discharges and carries away material eroded from the workpiece.

EDM machines are currently used for a large and increasing number of applications because EDM machines are generally capable of machining conductive materials that exhibit high hardness such as carbides. EDM machines can also machine conductive materials that exhibit high tensile strength, or are of otherwise poor machineability. For example, materials that are particularly thin or brittle may be machined using EDM even though conventional drilling, machining, or grinding would otherwise damage the workpiece. However, one complete EDM drilling operation is typically a slow process due to the minute amount of material that is removed from the workpiece during a single spark discharge. Accordingly, typical EDM machines are not fast enough for a number of production-paced applications. Further, EDM machines typically do not provide a flexible architecture suitable for certain automated machining operations. For example, a typical EDM machine has a limited number of axes of motion. Accordingly, an operator of an EDM machine may have to manually reposition a workpiece numerous times to complete the machining that a workpiece requires. The manual intervention of an operator is inefficient, time-consuming, and can potentially lead to increased likelihood of misalignment, or out of tolerance machine operation.

BRIEF SUMMARY OF THE INVENTION

The present invention provides electrical discharge machines that are capable of a relatively wide range of flexibility and range of motion for performing electrical discharge operations. For example, an electrical discharge machine according to at least one embodiment of the present invention can optionally comprise up to, and in excess of six axes of motion. To effectively remove the swarf that is generated during electroerosion operations, the present invention optionally provides both a primary and an auxiliary flushing system. The auxiliary flushing system is used to direct dielectric fluid towards the workpiece external to the electrode. The present invention also provides methods of performing high speed electrical discharge machining operations including determining the zero set conditions that indicate initiation of the electroerosion process.

According to one embodiment of the present invention, a method of performing an electrical discharge machine operation includes advancing an electrode toward a workpiece. At least while the electrode is being advanced towards the workpiece, monitoring of a power supply coupled between the electrode and the workpiece is carried out to detect a draw of current from the power supply as a result of a spark between the electrode and the workpiece. Also, monitoring of the motion of the electrode is carried out to detect dither of the electrode as a result of the spark. A zero set operation is performed if both the draw of current from the power supply and the dither of the electrode is detected, otherwise, the electrode is allowed to continue to transition towards the workpiece. After performing the zero set operation, a desired machining operation is performed.

According to another embodiment of the present invention, a method of performing an electrical discharge machine operation includes advancing an electrode toward a workpiece. At least while the electrode is being advanced towards the workpiece, monitoring of the motion of the electrode is carried out to detect dither in the travel of the electrode. A zero set operation is performed if dither of the electrode is detected, otherwise, the electrode is allowed to continue to transition towards the workpiece. After performing the zero set operation, a desired machining operation is performed.

According to another embodiment of the present invention, an electrical discharge machine includes an actuator and an electrode holder secured to the actuator arranged to selectively transition therealong, the electrode holder further arranged to receive and secure an electrode for unitary motion therewith. A drive device is coupled to the actuator, and a position sensor is communicably coupled to at least one of the drive device and the actuator. The drive device is arranged to provide a position signal that may be interpreted to determine the position of the electrode holder along the actuator. The position signal is communicably coupled to a controller. A power supply is arranged to be coupled between the electrode and a workpiece. A shunt sensor is communicably coupled between the power supply and the controller, the shunt sensor arranged to detect a draw of current therein.

An electrical discharge machine according to yet another embodiment of the present invention includes a base that supports a first table. The first table is arranged to selectively transition in a generally horizontal plane defining a first axis of motion and a second axis of motion generally orthogonal to the first axis of motion. A rotary table is releasably securable to the fist table, the rotary table arranged to selectively rotate about a generally vertical axis defining a third axis of motion. A column extends generally vertically from the base and supports a head unit secured thereto, the head unit arranged to selectively transition generally vertically along at least a portion of the column defining fourth axis of motion. A spinner unit having a generally elongate body is coupled to the head unit for unitary movement along the fourth axis of motion therewith, the spinner unit is further arranged to selectively rotate about a fifth axis of motion generally perpendicular to the fourth axis of motion.

A burning bead is secured to the elongate body of the spinner unit for unitary rotational movement about the fifth axis of motion therewith, the burning head further arranged to selectively transition along a sixth axis of motion defined along the length of the generally elongate body of the spinner unit. An electrode holder is coupled to the burning head and is arranged to receive an electrode therein. A first controller is arranged to selectively control the first, second, third, fourth, fifth, and sixth axes of motion of the electrical discharge machine in a manner to align the electrode with a workpiece positioned on a select one of the first table and the rotary table to perform a preprogrammed machine operation.

According to yet another embodiment of the present invention, an auxiliary flush system for an electrical discharge machine includes an electrode guide having a first end portion and a first aperture arranged to receive an electrode therethrough. A dielectric fluid delivery system is arranged to deliver dielectric fluid generally within an area about the first end portion of the electrode guide, the dielectric fluid further arranged to be directed towards a workpiece so as to flush the workpiece with dielectric fluid external to the electrode.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which:

FIG. 4 is an illustration of the dielectric flushing arrangement according to one embodiment of the present invention;

FIG. 5 is an enlarged view of the electrode guide illustrated in FIG. 4;

FIG. 6 is a bottom view of the electrode guide illustrating the arrangement of the auxiliary flush ports according to one embodiment of the present invention;

DETAILED DESCRIPTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that logical, mechanical and electrical changes may be made without departing from the spirit and scope of the present invention.

The Electrical Discharge Machine

Figure 1:
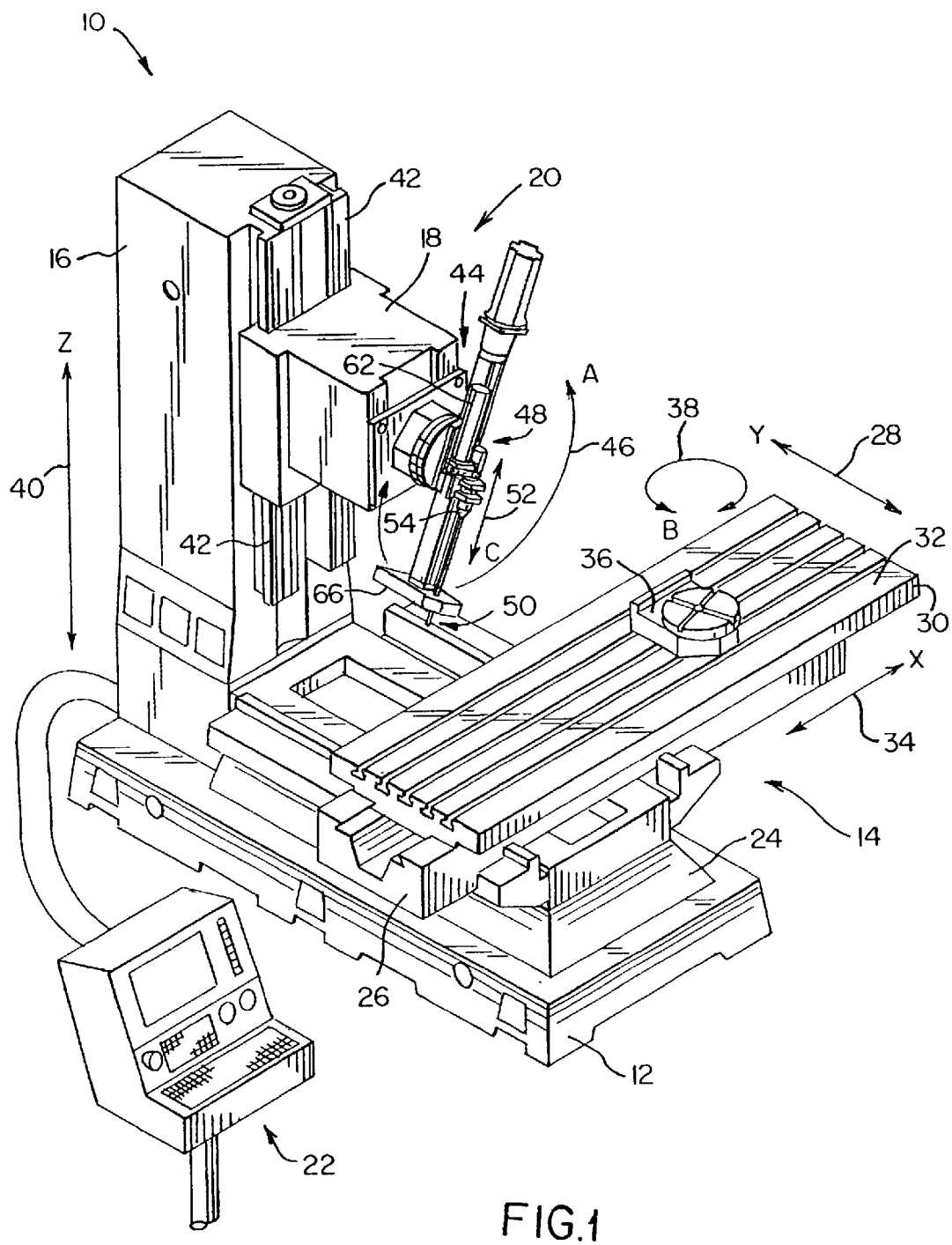
FIG. 1 is an isometric illustration of an electrical discharge machine according to one embodiment of the present invention having portions of the housing removed.

With reference to FIG. 1, an EDM machine 10 according to one embodiment of the present invention comprises a base 12 that supports a table assembly 14, a column 16 that extends generally vertically outward from the base 12, a head unit 18 supported by the column 16, a head assembly 20 that is mounted to the head unit 18, and a control unit 22 coupled to the EDM machine 10 to provide programmable control thereto. The general layout of the EDM machine 10 is fashioned in the likeness of a mill-style layout. Such architecture may provide a machine environment likely to be familiar to many operators, as milling machines are common tools in most machine shops.

The table assembly 14 includes a bed 24 fixedly secured to the base 12. The bed 24 provides rigid support and a high degree of stiffness to the EDM machine 10. A saddle 26 is mounted to the bed 24 for linear movement therealong, thus defining a first axis 28 of motion. The saddle 26 may be programmably controllable by the control unit 22 for selective movement traversely along the first axis 28 relative to the base. The first axis 28 may be defined for example, in a direction oriented such that the saddle 26 traverses towards, and away from the column, however other directions of travel may be implemented. A first table, also referred to herein as a worktable 30, has a first surface 32 for mounting one or more workpieces thereto. The worktable 30 is mounted to the saddle 26 in a manner such that the worktable 30 is programmably controllable by the control unit 22 to transition relative to the saddle 26 along a second axis 34 generally normal to the first axis 28. Accordingly, the worktable first surface 32 may controllably reciprocate about the second axis 34 relative to the saddle 26, and the worktable first surface 32 may controllably reciprocate along the first axis 28 in unitary movement with the saddle 26, thus providing a range of motion defined by a first plane. A rotary table 36 may optionally be releasably secured to the worktable first surface 32. The rotary table 36 is programmably controllable by the control unit 22 to selectively rotate in the first plane about a third axis 38 normal thereto. For example, the rotary table 36 may provide a full 360 degrees of rotational motion, however other ranges of rotational motion may be implemented. Additional or alternative structures and components may optionally be included as part of the table assembly 14. For example, the bed 24 may optionally be replaced with a knee or other structure to provide translation of the table assembly in a generally vertical direction.

The column 16 extends from one end of the base 12 and supports the head unit 18 mounted thereon. The head unit 18 is programmably controllable by the control unit 22 for linear movement along at least a portion of the column along a fourth axis 40. For example, one or more guide rails 42 may be provided on the column 16. The head unit 18 is slidingly received upon the guide rails 42 in a manner such that the head unit 18 may selectively and linearly transition along the guide rails 42 along the fourth axis 40.

The head assembly 20 is coupled to the head unit 18 for unitary linear motion about the fourth axis 40. The head assembly 20 includes a rotary head 44 mounted to the head unit 18 and programmably controllable by the control unit 22 to selectively rotate about a fifth axis 46 generally normal to the fourth axis 40. The rotary head 44 can provide any desired degree of rotational movement. For example a range of motion of +/−120 degrees of rotation may be sufficient for many EDM machining operations. An actuator 48 is fixedly secured to the rotary head 44 for rotational movement therewith. The actuator 48 provides a linear guide surface for programmably advancing and retracting an electrode 50 therealong, defining a sixth axis 52.

Figure 2:
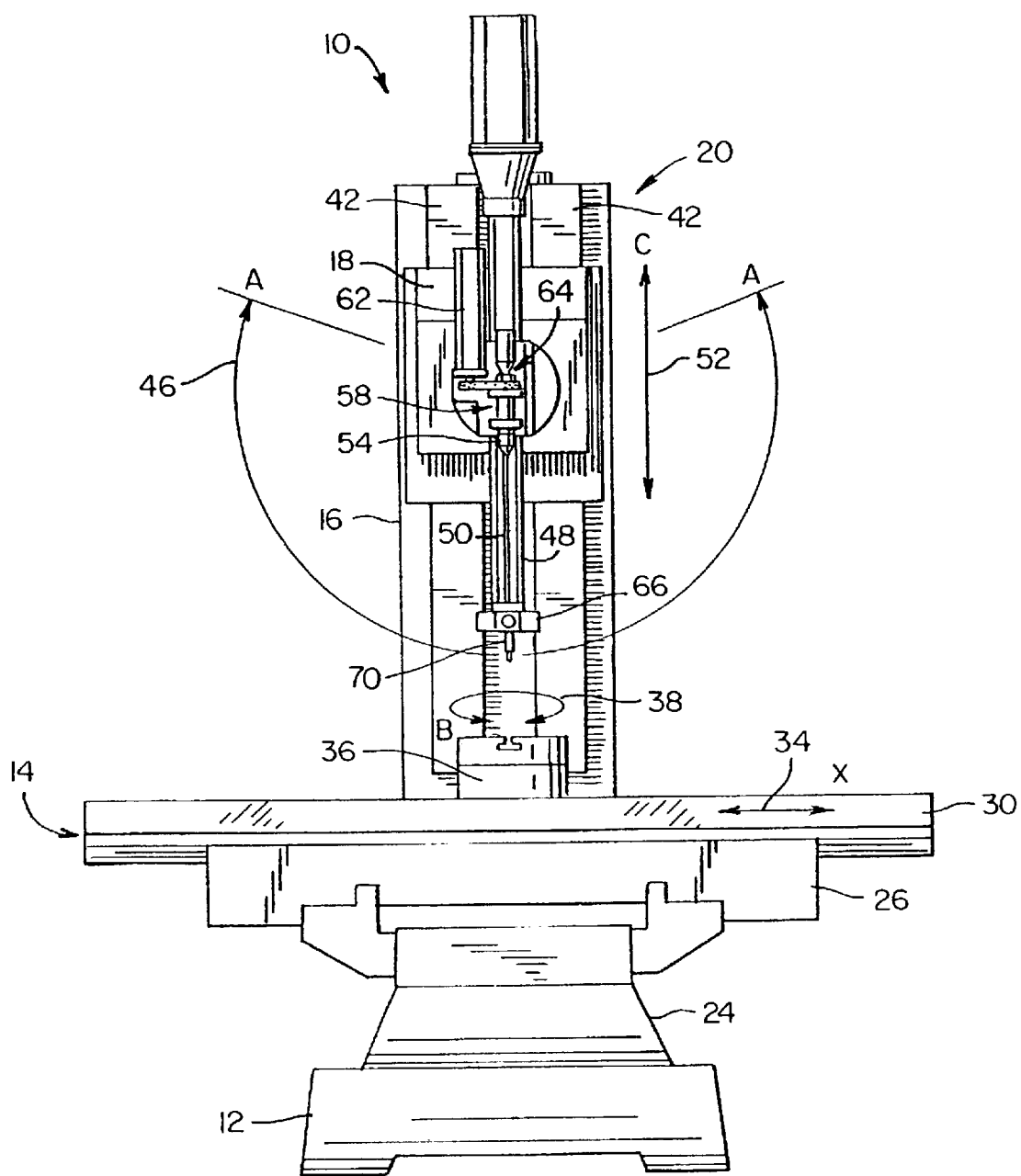
FIG. 2 is a front view of the electrical discharge machine illustrated in FIG. 1.
Figure 3:
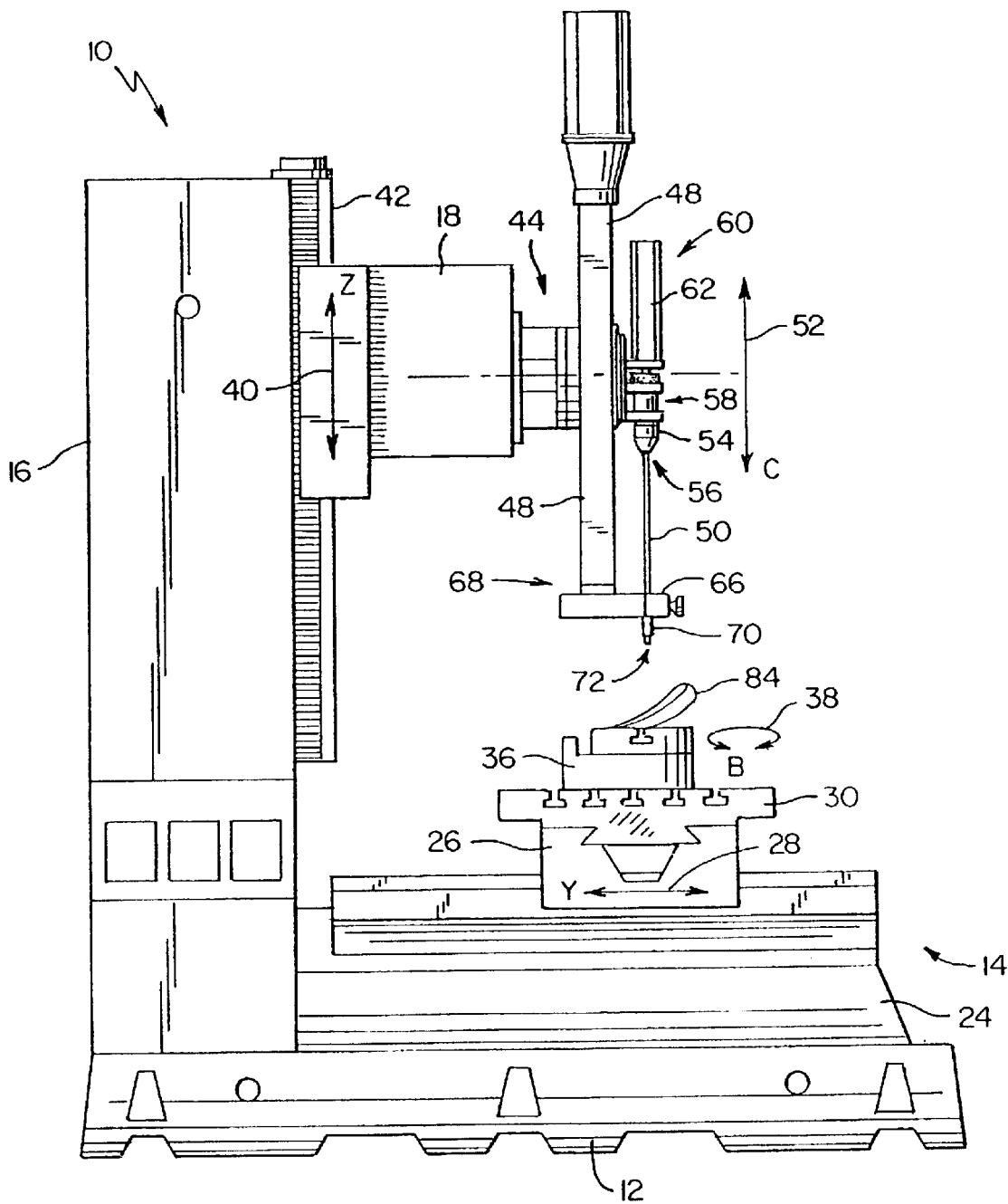
FIG. 3 is a side view of the electrical discharge machine illustrated in FIG. 1.

According to one embodiment of the present invention, the worktable 30 is transitionable along an 'X' axis 34 defined by a generally horizontal plane and in a direction generally lateral or across the width of the EDM machine as illustrated in FIGS. 1 and 2. Referring generally to FIGS. 1 and 3, the worktable 30 is further selectively transitionable along a 'Y' axis 28 defined by the generally horizontal plane in a direction normal to the 'X' axis 34. Also, the head unit is transitionable along at least a portion of the column defined by a 'Z' axis 40, which extends generally vertically from the base. Referring back to FIGS. 1 and 2, the rotary head unit defines rotational movement of at least a portion of the head assembly about an 'A' axis 46. Referring now to FIGS. 1–3 generally, the rotary table 36 provides a surface generally parallel to the worktable 30 for rotation about a 'B' axis 38. The electrode 50 is selectively transitionable along the actuator 48 defining a 'C' axis, or burning axis 52. The EDM machine 10 thus defines at least six axes of motion. The 'X', 'Y', and 'Z' axes 34, 28, 40 all comprise linear motion, the 'A' and 'B' axes 46, 38 define rotational motion, and the 'C' axis 52 defines a linear motion and further defines the burn axis for the electrode 50.

Referring to FIG. 3, the electrode 50 is secured by an electrode holder 54 such as a chuck or collet. The electrode holder 54 includes a first axial electrode passageway 56 for slidingly receiving the electrode 50 therethrough. The electrode holder 54 is fixedly supported by a sleeve portion 58 of the spindle assembly 60 and is arranged to grip and hold the electrode 50 during EDM machining operations. The spindle assembly 60 is coupled to an appropriate drive device 62 to controllably provide rotational movement of the electrode holder 54, and thus the electrode 50 during EDM machining operations. For example, a servo controlled, closed loop spindle assembly may be used to ensure consistent speed during EDM machining operations.

The spindle assembly 60 further defines a second electrode passageway 64 coaxial with the first electrode passageway 56 allowing the electrode 50 to recess into the sleeve portion 58 of the spindle assembly 60. An electrode guide 66 is fixedly secured to a first end portion 68 of the actuator 48. The electrode guide 66 includes a guide extension 70 aligned coaxially with the first electrode passageway 56 defining a third electrode passageway 72. The guide extension 70 is dimensioned to slidingly receive the electrode 50 therethrough, yet support the electrode 50 and keep the electrode 50 substantially aligned during EDM machining operations; in cooperation with the first and second electrode passageways 56, 64.

The size and cross-section of the electrode affect the size and geometry of the hole that will be machined during EDM operations. Accordingly, the EDM machine 10 according to various embodiments of the present invention can accept relatively small electrodes. Further the spindle assembly 60 may rotate the electrode 50 at any appropriate speed. For example, the electrode 50 may be rotated at rates from zero revolutions per minute (rpm) up to, and in excess of 5,000 rpm.

Referring back to FIG. 1, each of the various first through sixth axes 28, 34, 38, 40, 46, and 52 are selectively and programmably controllable by the control unit 22. The control unit 22 may optionally be programmed using typical mill-style programming including for example, M&G codes, FANUC programming post, CNC programming, or any other programming format desired. According to one embodiment of the present invention, the software in the control unit 22 is set up in terms of a milling front end, using pages of data sets. That is, a user fills in coordinate positions for the desired machining operation. The data pages can be organized in any logical fashion, and can include any number of default settings.

Any desired functionality may be programmed into the control unit 22. For example, a total number of burns can be programmed and tracked by the control unit 22. When the control unit 22 detects the total number of burns have been reached, the control unit 22 may advance the electrode to a home, or predetermined position. This is advantageous, for example, where the EDM machine operator wishes to replace the electrode, or perform some inspection work. Once the desired adjustments are made, the program can pick up where it left off. For example, after changing the electrode, the control unit 22 auto-advances and the program picks up where it left off with a particular machining operation. As another example, the program may optionally take advantage of a burn timer that tracks burn time. The burn time may then be analyzed to adjust the EDM parameters to effect optimization of quality and speed. The control unit 22 may interact with additional logic to provide the desired machining operations as described more fully herein. The control unit 22 may also be used to control and adjust power supply parameters, operational parameters such as rotational speed of the electrode, the pressure of the dielectric flushing system, or other parameters related to EDM machine operation and performance.

In some applications, a user may decide not to recycle the dielectric fluid. However, where recycling is desirable, it is important to filter the dielectric as thoroughly as possible. According to one embodiment of the present invention, a dielectric filtration system and settlement tank are integral with the casting for the EDM housing to provide a convenient access and control over dielectric filtration.

Dielectric Flushing System

Referring to FIG. 4, the EDM machine according to one embodiment of the present invention provides a flushing system 74 comprised of a primary flush 76 and an auxiliary flush 78. The primary flush 76 is a center flushing arrangement that directs pressurized dielectric fluid 80 through a fluid passageway 82 and through a hollowed out electrode 50. The dielectric fluid 80 is directed towards a workpiece 84 with sufficient pressure to remove the swarf and other debris from the area of the workpiece 84 being machined. Any delivery means may be provided to supply the dielectric fluid 80. For example, a union 86 or other coupling arrangement may be used to couple a first dielectric fluid delivery system 88 to the fluid passageway 82 and to the electrode 50.

An auxiliary flush 78 is also provided. As shown, the electrode 50 passes through the electrode guide 66 and guide extension 70. The electrode guide 66 is hollowed out providing an auxiliary flush channel 90 for the delivery of dielectric fluid 80 to the workpiece 84. A second dielectric fluid delivery system 92 delivers pressurized dielectric fluid 80 to the auxiliary flush channel 90 in the electrode guide 66. The first and second flush delivery systems 88, 92 may be the same delivery system, or may include at least some independent hardware. Referring to FIGS. 4 and 5 generally, the dielectric fluid 80 is forced out of the electrode guide 66 such that dielectric fluid 80 is directed about at least a portion of the outside of the electrode 50. In this respect, the auxiliary flush may serve as a fluid bearing to help align and guide the electrode 50 during EDM machining operations. Such an arrangement may be beneficial for example, when drilling deep holes in the workpiece 84.

The delivery of the auxiliary flush towards the workpiece 84 and generally about the circumference of the electrode 50 may be accomplished in any manner. A structure for the delivery of the auxiliary flush is illustrated in FIG. 6, which illustrates the bottom (workpiece) side of the electrode guide 66. A guide extension aperture 94 is positioned generally centered about the first end portion 96 of the electrode guide 66. The guide extension aperture 94 is configured to allow a guide extension 70 to be received by, and secured to, the electrode guide 66. The electrode SO passes through the guide extension. A series of flush apertures 98 are positioned radially outward from the center of the guide extension aperture 94 so as to circumscribe the guide extension aperture 94. Any number of flush apertures 98 may be provided, depending upon the desired auxiliary flush performance. Further, the size and position of the flush apertures 98 may be modified as the application dictates.

Referring back to FIGS. 4 and 5, during EDM machine operations, the combination of the primary flush 76 and the auxiliary flush 78 fills the gap between the electrode 50 and workpiece 84 and acts as an insulator until a specific gap and voltage are applied therebetween. When the proper gap spacing between the electrode 50 and workpiece 84 are realized, and when the proper voltage is applied to the electrode 50 with respect to the workpiece 84, the dielectric fluid 80 at least partially ionizes and becomes an electrical conductor allowing a current (spark) to flow through the workpiece 84 thus electroerosion occurs. A crater or pit is formed on the surface of the workpiece 84, and the swarf, including the workpiece debris is carried away by the dielectric flush 80.

The dielectric flush pressure can range from zero pounds per square inch (psi) up to and in excess of 1,000 psi. The dielectric fluid may comprise any nonconductive liquid such as distilled water, kerosene, transformer oil or other fluid usable for EDM machining operations. Further, a catalyst or other additive may be combined with the dielectric fluid to alter the dielectric performance. For example, a catalyst such as particulates of graphite and metal may be added to the dielectric fluid to establish a current path in the dielectric fluid.

Determination of Zero Set

In EDM operations according to various embodiments of the present invention, the electrode and the workpiece are brought into proximate relationship, and a controlled electroerosion processes is utilized to perform a machining operation. At the initiation of a particular cycle however, the electrode may be positioned some distance from the workpiece. Accordingly, it is desirable to rapidly advance the electrode towards the workpiece to a position suitable for EDM machining operations. However, once the electroerosion process has begun, the rate at which the electrode may advance towards the workpiece is limited by the rate at which the minute amounts of material are removed during each spark discharge of the EDM machining operation.

Accordingly, it is desirable to determine and/or control the start of the electroerosion process as the electrode is advanced into sufficient proximity to the workpiece to enable an EDM machining operation. Further, it is often desirable to determine the optimal gap spacing between the electrode and the workpiece that provides the most efficient electroerosion of the workpiece. Thereafter, and until the completion of the machining operation, it is sometimes desirable to maintain substantially the determined optimal gap spacing.

Figure 7:
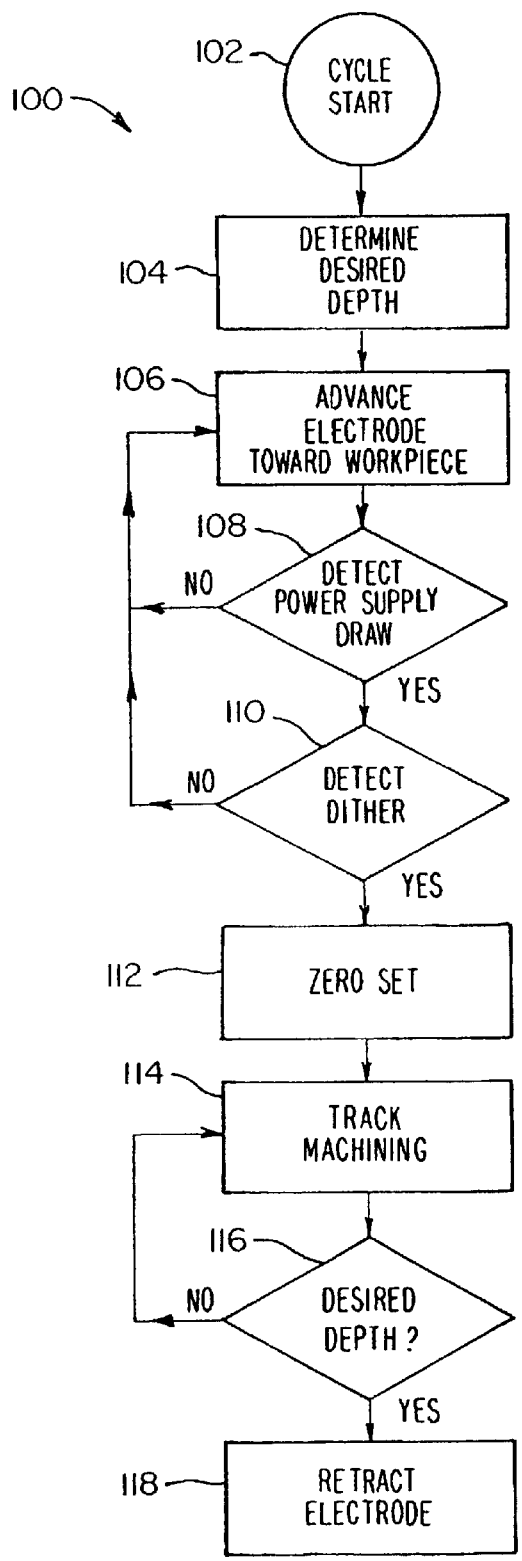
FIG. 7 is a flow chart illustrating a method and process for determining zero set during electrical discharge machining according to one embodiment of the present invention.

According to one embodiment of the present invention, a process 100 for carrying out an EDM machining operation, including determining the zero set (initial start of the electroerosion process) is outlined in the flow chart of FIG. 7. A start cycle at block 102 initiates the beginning of an EDM machining operation. At some point either prior to, or subsequent to the initiation of the process 100, the desired depth of the EDM machining operation being performed is determined, as indicated by block 104. After the initiation of the start cycle at block 102, the gap between the electrode and the workpiece is closed, for example, by advancing the electrode towards the workpiece as illustrated at block 106.

As the gap between the electrode and the workpiece closes, the power supply coupled between the electrode and the workpiece is monitored to detect a draw or drain thereon, which is sufficient to suggest a spark has occurred across the gap between the electrode and the workpiece as illustrated by decision block 108. That is, at some point as the electrode and the workpiece close in proximity, the power supply will spark and current will flow through the electrode and workpiece. When an electroerosive spark occurs, there is a detectable draw on the power supply. If no draw on the power supply is detected, the electrode continues to advance toward the workpiece. If a draw on the power supply is detected however, it is possible that the electrode is in sufficient proximity to the workpiece for machining.

However, the environment in which EDM operations occur is dynamic, and factors other than true electroerosive sparking may cause a detectable draw or other fluctuation in the power supply. For example, the electrode may make contact with, or come within proximity with something that causes the power to fluctuate, such as the dielectric flush or a foreign object touching or in close proximity with the electrode.

A second check is thus provided to ensure that the electrode is in proper position for machining the workpiece. According to one embodiment of the present invention, the motion of the electrode is tracked and monitored for dither as illustrated by decision block 110. During EDM machining, the electrode will dither in response to the train of electrical pulses that supply the power for the spark, or current flow across the gap between the electrode and the workpiece. By dither, it is meant that the electrode will not maintain a fixedly maintained position with respect to the workpiece. Rather, a small amount of motion somewhat related to oscillation or vibration will occur as a result of the sparking action.

If dither is detected at decision block 110, then the detected power supply draw detected at decision block 108 is confirmed as the correct start of the EDM machining process and the zero set is identified, as illustrated by block 112. When zero set has been identified, the necessary zero set operations are performed. For example, a zero value may be recorded on a data page in the controller, and the controller may issue any necessary commands, such as control parameters sent to the power supply, to initiate machining operations. If no dither is detected, or if the detected dither is insufficient to warrant the conclusion that true electroerosion has occurred, then the gap between the electrode and the workpiece is allowed to continue to close, as illustrated by the feedback from block 110 to block 106. Once the zero set has been obtained and the necessary zero set operation are performed, the machining operation ensues, and the depth of the EDM machining operation is tracked, as illustrated by block 114. The measured machining depth is compared to the desired depth of the machining operation obtained at block 104, as illustrated by the decision block 116. The process 100 will continue to track the machined depth until the desired depth has been reached, at which time the electrode and the workpiece are separated, that is, the electrode is retracted as illustrated by block 118, and the cycle completes as necessary.

System to Determine Zero Set

The process 100 discussed with reference to FIG. 7 may be implemented according to one embodiment of the present invention, as a system 200 schematically illustrated in FIG. 8. In order to effect electroerosion, the electrode 202 and the workpiece 204 must be electrically activated. To provide power suitable for EDM machining, an electrode power supply 206 generates a train of direct current (DC) output pulses. For example, a multivibrator 208 is either integrated with a DC power source 210 or coupled thereto, to control the electrode power supply 206 in a manner such that a train of DC pulses may be realized.

The multivibrator 208 is further coupled to a master controller 212 so that parameters of the multivibrator 208 may be controlled. For example, the multivibrator 208 may be programmed such that the "on time" and "off time" of each electrode power supply pulse may be precisely controlled. Each pulse represents the discharge or draw of a quantity of electrical energy from the electrode power supply 206 having a preset voltage and amperage that is expended over a preset time. The pulse "on time" and the pulse "off time" drive the frequency of the pulse train. The pulse "on time" is the duration time of the EDM spark, typically measured in microseconds. The pulse "off-time" is the time between sparks, again, typically measured in microseconds.

The DC power source 210 preferably includes a bank of capacitors connected between the electrode 202 and workpiece 204. Under this arrangement, the current for the spark comes directly from the capacitors when they are discharged. Also, a current limiter 214 is preferably coupled to, or integrated with, the electrode power supply 206 to protect the DC power source 210 during operation. The master controller 212 may also be communicably coupled to the electrode power supply 206 in a manner that enables the master controller 212 to control parameters such as maximum current allowed by the current limiter 214, charge to the capacitors, DC voltage level generated by the DC power source 210, and other parameters. It will be appreciated however, that other types of power supplies may be used with the present invention, and the level of integration between the electrode power supply 206 and the master controller 212 may vary depending upon the desired flexibility desired.

The electrode power supply 206 couples between the electrode 202 and the workpiece 204. When the electrode power supply 206 is energized and the gap "G" between the electrode 202 and the workpiece 204 is sufficiently small, the electrode power supply 206 will spark and current will flow between the electrode 202 and the workpiece 204. As current flows through the circuit defined by the electrode 202, workpiece 204 and DC power source 210, a draw or variance can be detected on the electrode power supply 206. As used herein, the term gap voltage can take on generally two different values during each pulse of the pulse train output by the electrode power supply 206. The Open Gap Voltage is the voltage measurable across the gap "G" before the spark current begins to flow. The working gap voltage is the voltage measurable across the gap "G" during the spark current discharge of the DC power source 210.

A measure of the draw on the electrode power supply 206 can be translated into a determination of the spacing of the gap "G" between the electrode 202 and the workpiece 204. In order to translate electrode power supply draw into a measure of the gap between the electrode 202 and the workpiece 204, a shunt sensor 216 is coupled to the electrode power supply 206. The shunt sensor 216 may comprise for example, a voltage or current measuring device coupled integral with, or external to the electrode power supply 206. According to one embodiment of the present invention, the shunt sensor 216 outputs a voltage value that tracks the current draw on the power supply. The range extends from a predefined minimum value of volts, indicating that no or substantially no current is being output by the power supply, to a maximum value of volts indicating that the maximum current, or predefined maximum allowable current is being output by the power supply. Any range of values, either discrete or continuous may be used, and the precise range will depend for example, upon the type of shunt sensor 216 used.

The output of the shunt sensor 216 will likely comprise a value that is incompatible with the master controller 212. For example, the shunt sensor 216 may output a signal that reflects the amount of current output by the power supply expressed as a range of values from 0 (no or minimum current output) to a maximum value signal of one (1) or less (maximum current output). However, it is not uncommon for the master controller 212 to require a minimum of 24 volts or more as an input. Under such circumstances, the output of the shunt sensor 216 is input into a signal intensifier 218. The signal intensifier 218 amplifies (scales) the shunt sensor output to a level that is more easily manipulated by other processors, logic, or control devices.

The output of the signal intensifier 218 is then optionally coupled to a signal translator 220. The signal translator 220 maps the scaled shunt sensor output to a value suitable for detecting zero set. According to one embodiment of the present invention, a particular shunt sensor value, which corresponds to a certain amount of current output by the power supply, is mapped to a value that represents the distance or gap between the electrode 202 and the workpiece 204. That is, the desired spacing of the gap "G" is defined and mapped to a corresponding signal level. As an example, assume a gap of 0.1 millimeters is desired. This gap spacing is mapped to a corresponding (optionally arbitrary) signal value, such as the minimum signal level required to fire a control device. Continuing the above example, assume that the shunt sensor 216 outputs a voltage level between 0 and 0.1 volts that corresponds to a range of the programmed maximum and minimum current output capable by the electrode power supply 206. Also, assume that a shunt sensor voltage level of 0.07 volts corresponds to an amount of current draw on the electrode power supply 206 experienced when the desired gap spacing of 0.1 millimeters is achieved. Also assume that a 5 volt signal is required to fire a controller. The signal intensifier 218 and the signal translator 220 are configured so that a reading of 0.07 volts from the shunt sensor 216 maps to 5 volt output of the signal translator 220, and thus fires the necessary control device.

When a predetermined gap between the electrode 202 and the workpiece 204 is realized, the output of the signal translator 220 is identified as the cutoff voltage $V_{Cutoff}$. The signal translator output is input to a first programmable logic controller (PLC) controller 222, and the first PLC controller 222 is coupled to the master controller 212. Accordingly, the signal intensifier 218 and the signal translator 220 serve to map the shunt sensor signal to a value that the first PLC controller 222 can easily identify as cutoff voltage $V_{Cutoff}$. Likewise, the first PLC controller 222 serves to fire a signal that can be read by the master controller 212.

Optionally, one or more fine-tuning adjustments may be provided to the signal translator 220, the signal intensifier 218, or shunt sensor 216. According to one embodiment of the present invention, a first control 224 is selectively coupled to the signal translator 220 by a first switch 226. The first switch 226 is coupled to the master controller 212 for control thereby. The first control 224, also referred to herein as the zero set control, may comprise for example, a factory default or preset setting that interacts with the signal translator 220 to tweak the mapping of the scaled shunt sensor signal such that the zero set will be recorded at a predetermined gap between the electrode 202 and the workpiece 204 when the first control 224 is actively coupled to the signal translator 220. As shown, a second control 228 is selectively coupled to the signal translator 220 by a second switch 230. The second switch 230 is coupled to the master controller 212 for control thereby. The second control 228 may comprise for example, a user programmable control that allows the user to control the gap between the electrode 202 and the workpiece 204 when the second control 228 is actively coupled to the signal translator 220.

Although shown and described herein generically and schematically as a typical electronically controlled contact style switch, the term "switch" is to be interpreted expansively and includes mechanical, electrical, as well as software based controls arranged to selectively couple or decouple two or more signals. For example, a switch as used herein may comprise one or more poles and one or more throws in any combination. A switch may comprise a mechanical switch or relay. A switch may also comprise an electronic switch including for example, a transistor, including gate-type transistors, electronic trigger devices including thyristors, silicon controlled rectifiers, power field effect transistors, and semiconductor circuits including multiplexers.

The master controller 212, or other device may control which, if any of the first and second controls 224, 228 is actively coupled to the signal translator 220. The first and second controls 224, 228 may comprise for example, potentiometers, switches, dipswitches, logic circuits, software encoded values, digitally stored values, hardware encoded values, or other devices arranged to communicate one or more settings to the signal translator 220. The first and second controls 224, 228 may also be optionally be coupled to devices other than the signal translator 220, so long as the first and second controls 224, 228 interact to adjust the determination of the zero set, or to adjust the gap spacing maintained during EDM machining.

The electrode 202 is secured to a drive catch or other transitionable member of an actuator 232 in such a manner that the electrode 202 may traverse at least a portion of the length of the actuator 232. As used herein, the term "actuator" is to be interpreted expansively to encompass any device on which the electrode 202 may selectively or controllably traverse. The actuator 232 is coupled to a drive device 234 such as a motor in such a manner that the actuator 232 translates the motion of the drive device 234 into linear travel of the electrode 202. The motor can be any motor suitable for EDM applications, including for example, a brushless AC motor or a stepper motor. The motor may be coupled either directly to the actuator 232, or may require coupling, gearboxes or other interconnecting components. Other drive mechanisms may also be used to enable linear motion of the electrode 202. For example, the electrode 202 may be fixedly held by a translatable arm connected to any device that is adapted to advance and retract the arm and electrode 202 linearly.

The drive device 234 is further coupled to a pulse width modulator (PWM) controller 236, which is coupled to a master controller 212. The master controller 212 is programmably arranged to communicate with the PWM controller 236, which in turn communicates with the drive device 234 to selectively and programmably advance and retract the electrode 202 in a linear fashion along the actuator 232. The control signals used to communicate between the PWM controller 236 and the master controller 212 may require signal amplification, translation, or other manipulation to enable proper communication between the various components. Accordingly, additional circuitry including for example, processors, switches, relays, amplifiers, and other logic may be required. Likewise, depending upon the arrangement of the master controller 212 and the selection of the drive device 234, the PWM controller 236 may not be required at all.

A position sensor 238 is communicably coupled to a second PLC controller 240 and to the drive device 234. The second PLC controller 240 is further coupled to the master controller 212. The position sensor 238 is arranged to provide a position signal that may be interpreted to determine the position of the electrode holder along the actuator 232. For example, the position sensor 238 may provide information to the second PLC controller 240 that can be translated either directly or indirectly into positional information that identifies either the position of the electrode 202 along the actuator 232, or the relative movement of the electrode 202 along the actuator 232. The second PLC controller 240 is arranged to communicably translate a position signal from the position sensor 238 to the master controller 212.

For example, the position sensor 238 may comprise an encoder that is either integrated with the motor, or coupled to the motor as a separate component. The encoder outputs a signal that can be interpreted to represent for example, the position of the electrode 202 as it traverses along at least a portion of the actuator 232 towards and away from the workpiece 204 to be machined. For purposes of discussion herein, motion of the electrode 202 along the actuator 232 and away from the workpiece 204 is designated as having a positive (+) polarity. Motion of the electrode 202 along the actuator 232 and towards the workpiece 204 is designated as having a negative (−) polarity.

The master controller 212 is also coupled to a depth tracker 242 to determine the required depth of a selected machining operation. The depth tracker 242 may comprise for example, a data page within the master controller 212 or within a separate logic device, a separate module, a hardware encoded value or values, or any other depth tracking hardware or software arranged to communicate a desired depth for a programmed machining operation.

In summary, according to one embodiment of the present invention, the shunt sensor 216 is used to track the draw on the electrode power supply 206, which in turn provides an indication of when a spark is formed between the electrode 202 and the workpiece 204. The shunt sensor signal is translated into a value that determines the gap "G" between the electrode 202 and the workpiece 204, and is used to trigger when the appropriate gap spacing is realized for zero set conditions. The determination of the zero set condition is verified by also checking for indications of electrode dither. When both the shunt sensor and dither information agree that a zero set condition has occurred, the zero set it identified, and the EDM machining process may commence.

In operation, a cycle start is initiated to perform a preprogrammed machine operation. For example, the master controller 212 may be programmed using computer numeric control (CNC) programming to direct a precise machining operation. The master controller 212 may fire one or more switches that energizes the electrode power supply 206 as necessary, and the master controller 212 may issue commands that cause the initialization of controls on the various PLC controllers, motor controllers, and other devices, including initialization of select software. The master controller 212 may also fire the first switch 226 such that the first control 224 (zero set control) is coupled to the signal translator 220.

The master controller 212 at some point, preferably before the EDM machining operation commences electroerosion, interacts with the depth tracker to determine the desired or programmed depth of the current machining operation. The master controller 212 also initiates a command to the PWM controller sufficient to cause the actuator 232 to advance the electrode 202 towards the workpiece 204.

As the electrode 202 closes in proximity to the workpiece 204, the shunt sensor 216 tracks the draw on the electrode power supply 206. The shunt sensor signal is scaled by the signal intensifier 218, and translated by the signal translator 220. When the electrode 202 has closed in proximity to the workpiece 204 by predetermined gap spacing, the signal translator 220 will reach the cutoff voltage $V_{Cutoff}$, and fire the first PCL controller 222, which will in turn fire a signal to the master controller 212 indicating that the shunt sensor 216 has detected a zero set condition.

The second PCL controller 240 monitors the output of the position sensor 238 such as an encoder for an indication of dither. If a dither signal is detected, the second PLC controller 240 fires a signal to the master controller 212. For example, according to one embodiment of the present invention, dither may be detected by transitioning the electrode 202 in a first direction towards the workpiece 204, and detecting a change in direction of the electrode 202. The electrode 202 is transitioned towards the workpiece 204 in a direction designated as having a negative polarity. When a polarity change is detected, that is, when the electrode 202 is detected as traveling in a positive polarity (away from the workpiece 204), then dither is identified. The electrode travel distance required to classify a detected polarity change as dither will depend upon a number of factors including the manner in which the electrode travel is detected. For example, where a rotary optical encoder is used having approximately 8000 pulses per revolution, a polarity change of one to five encoder pulses may be sufficient to adequately detect dither.

Upon both the first and second PLC controllers 222, 240 firing, the master controller 212 implements the zero set operation. For example, the master controller 212 may signal a screen display to set a zero value in a predetermined screen position. Also, a zero value may be set in one or more data pages as the software dictates. If only the first or the second PLC controller 222, 240 fires, then the master controller 212 interprets the firing as a false signal, and the signal is ignored. Accordingly, the electrode 202 is permitted to continue to advance towards the workpiece 204.

Once the zero set conditions are satisfied, the master controller 212 monitors and maintains for example, the peak current, capacitance, and "on" and "off" times programmed into the electrode power supply 206. The master controller 212 may also optionally turn the first switch 226 off and switch the second switch 230 on. Switching the second switch 230 on couples the second control 228 to the signal translator 220, thus allowing user programmed fine adjustments to the gap spacing after the zero set operations are performed.

The shunt sensor 216 may also be used to maintain the gap between the electrode 202 and the workpiece 204 at an optimal spacing for effective electroerosion. For example, according to one embodiment of the present invention, the shunt sensor 216 is configured to output a shunt signal representing a voltage within the range of 0 volts up to approximately 100 millivolts. Any other suitable ranges may be used however. After scaling and transforming the shunt sensor signal by the signal intensifier 218 and the signal translator 220, a predetermined signal value is designated as the voltage cutoff $V_{Cutoff}$, which is typically set to 3 to 5 volts. For example, the optimal gap spacing may be realized at a shunt sensor signal level of 70 millivolts. The shunt sensor signal is thus intensified and translated such that a 70 millivolt signal output by the shunt sensor 216 maps to approximately 5 volts at the output of the signal translator 220. So long as the transformed signal is less than $V_{Cutoff}$, the electrode 202 is advanced towards the workpiece, albeit at a relatively slow rate. When the transformed shunt sensor signal exceeds $V_{cutoff}$, then the first PLC controller 222 fires and the electrode 202 is retracted from the workpiece 204. Maintaining the transformed shunt sensor signal at substantially $V_{cutoff}$ maintains generally, the appropriate gap spacing as the erosion process drills into the workpiece.

According to one embodiment of the present invention, the system is a closed loop system while the electrode 202 advances towards the workpiece 204 prior to zero set operation, and then becomes an open loop system during the machining operation. That is, subsequent to initiation of a start cycle, and prior to zero set, the master controller 212 uses feedback to decide when to perform the zero set operation. Subsequent to the zero set operation and prior to the electrode retract operation subsequent to EDM machining the workpiece 204 to the desired depth, the electrode power supply 206 is allowed to operate to produce a train of pulses for EDM machining, and the signal from the shunt sensor 216 is used to drive, track and maintain the relative gap spacing between the electrode 202 and the workpiece 204 until the desired machining depth has been obtained, behaving as an open-loop system. Once the desired depth has been obtained, the master controller 212 retracts the electrode 202 and the cycle completes. The first and second PLC controllers 222, 240, PWM controller 236, first and second switches 226, 230, electrode power supply 206, required software, and any other devices are reset as necessary for the next machining operation.

While the shunt sensor signal herein has been described in terms of a voltage range corresponding to a current draw of the electrode power supply 206, the shunt signal can take any form from a voltage, current, or any other signal. Also, the exact ranges of shunt sensor signal values detected will vary.

Zero Set Determination Alternative Embodiment

Figure 8:
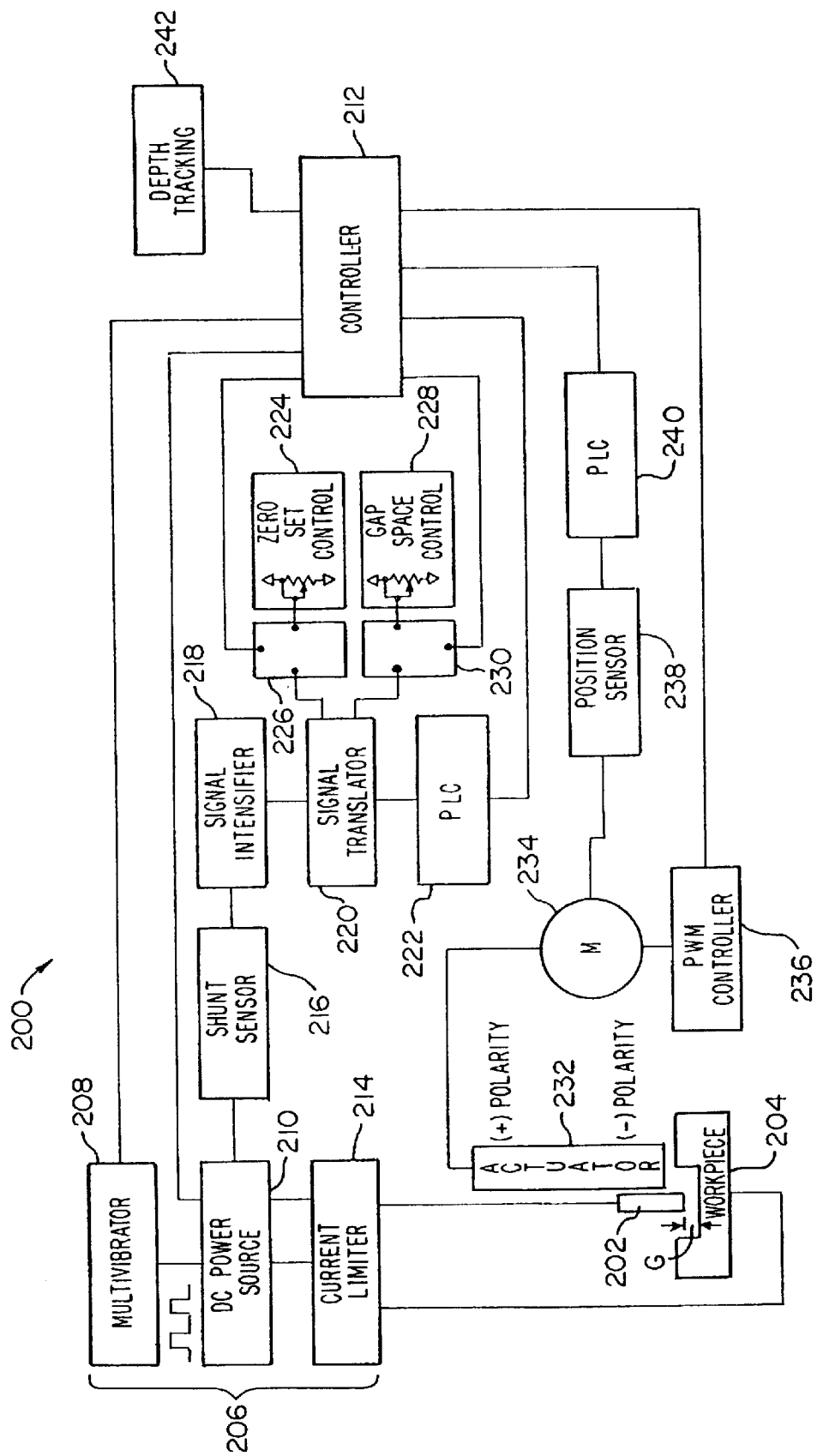
FIG. 8 is a schematic diagram of a system for determining zero set.
Figure 9:
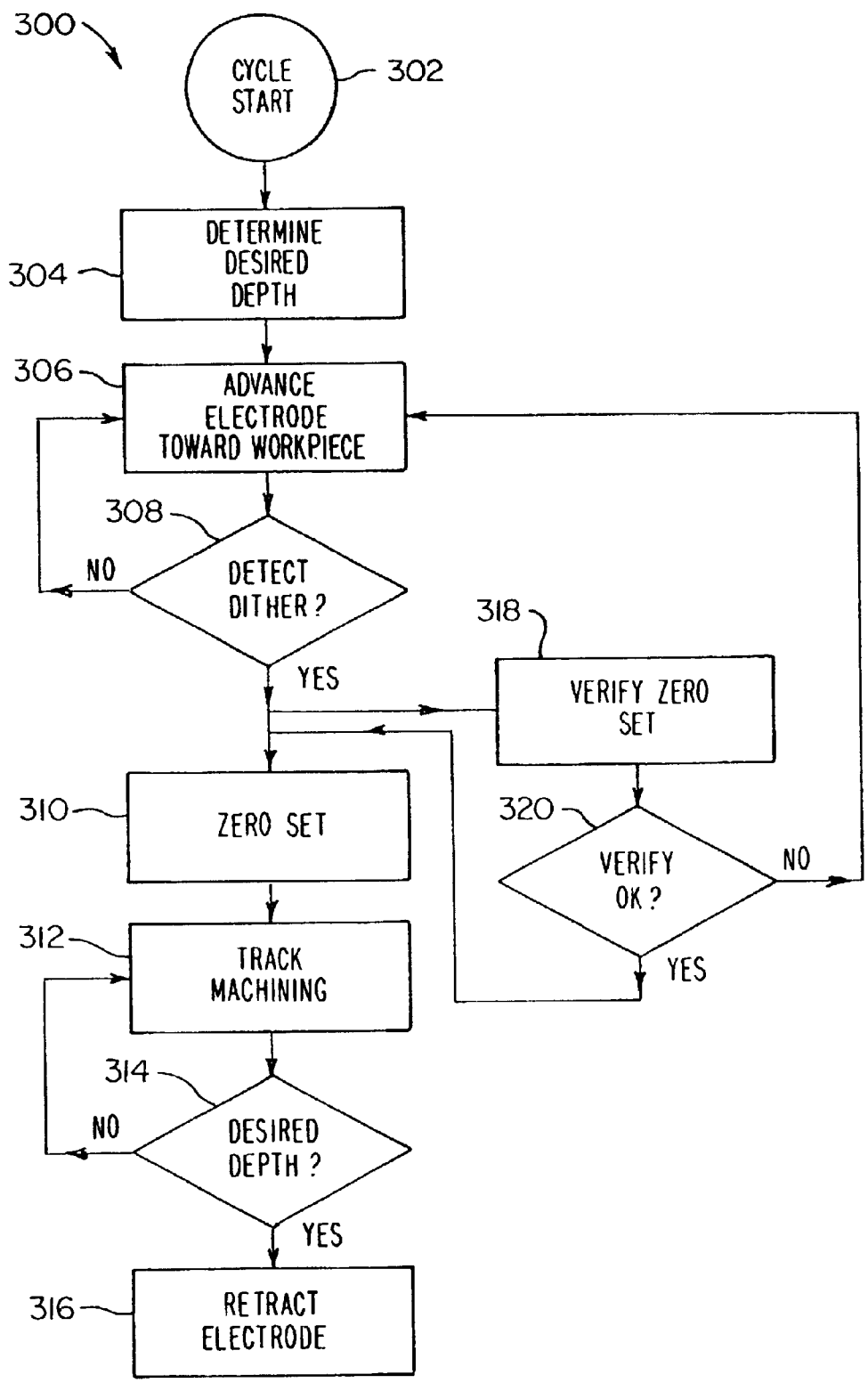
FIG. 9 is a flow chart illustrating a method and process for determining zero set during electrical discharge machining according to another embodiment of the present invention.

A process 300 for determining the zero set according to another embodiment of the present invention is outlined in the flow chart of FIG. 8. This process is similar to that described with reference to FIGS. 6 and 7, however, in the process discussed with reference to FIG. 8, the zero set is determined based primarily, or alternatively solely, on the detection of dither on the encoder pulses. A start cycle at block 302 initiates the beginning of a machine operation. At some point during the cycle, the depth of the machining operation being performed is determined, as indicated by block 304. While illustrated generally at the beginning machine operation and after the start cycle at block 302, the depth determination at block 304 may occur at any time either prior to, or subsequent to the start of the process 300. After the initiation of the start cycle at block 302, the gap between the electrode and the workpiece is closed, for example, by advancing the electrode towards the workpiece as illustrated at block 306.

As the gap between the electrode and the workpiece closes, the motion of the electrode is tracked, and a decision is made as to whether dither has been detected, as illustrated by decision block 308. If dither is detected at decision block 308, then the zero set is identified and a zero set operation is performed, as illustrated by block 310. If no dither is detected, or the detected dither is insufficient to warrant the conclusion that true electroerosion has occurred, then the gap between the electrode and the workpiece is allowed to continue to close, as illustrated by the feedback from decision block 308 to block 306. Once the zero set has been identified, the machining operation ensues, and the depth of the EDM machining operation is tracked, as illustrated by block 312. The measured machining depth is compared to the desired depth of the machining operation obtained at block 304, as illustrated by the decision block 314. The process 300 will continue to track the machined depth until the desired depth has been reached, at which time the electrode and the workpiece are separated, that is, the electrode is retracted as illustrated by block 316, and the cycle completes.

In addition to testing or checking for dither in the electrode, other checks or tests may optionally be performed to substantiate or verify that the detected dither is indicative of zero set conditions. For example, a shunt measurement of the power supply can be considered as described more fully herein. Alternatively, a voltage or current measurement may be taken directly across the gap spacing between the electrode and the workpiece. Under any of the above optional embodiments, a verifying measurement is taken at block 318, and the verifying measurement is compared against a predetermined value as illustrated by decision box 320. If the verification indicates that a true zero set occurred, the zero set is identified as illustrated by feedback from the decision box 320 to the zero set box 310. Alternatively, if the verification decision rules out a proper zero set, the electrode is permitted to continue to advance towards the workpiece, as illustrated by feedback from the decision box 320 to box 306. For example, the verifying measurement may comprise a check for the presence or absence of a voltage or range of voltages, or a change in a measured voltage or range of voltages. Likewise, optionally, the verifying measurement may comprise a check for the presence or absence of a current or range of currents, or a change in a measured current or range of currents. Also, the verifying measurement may be derived from a scaled, transformed or otherwise manipulated value of any of the above measurements.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of performing an electrical discharge machine operation comprising:
    advancing an electrode toward a workpiece;
    monitoring a power supply coupled between said electrode and said workpiece to detect a draw of current from said power supply as a result of a spark between said electrode and said workpiece;
    monitoring the motion of said electrode to detect dither of said electrode as a result of said spark;
    performing a zero set operation if both said draw of current from said power supply and said dither of said electrode is detected, otherwise, continuing to transition said electrode towards said workpiece; and,
    performing a machining operation after said zero set operation is performed.

2. The method according to claim 1, further comprising:
    determining a desired depth of a machining operation prior to retracting said electrode.

3. The method according to claim 1, wherein a measured draw of current on said power supply is translated into a determination of a gap spacing between said electrode and said workpiece.

4. The method according to claim 1, wherein said draw of current is detected by measuring a signal provided by a shunt sensor coupled to said power supply.

5. The method according to claim 4, further comprising a signal intensifier coupled to said shunt sensor, said signal intensifier arranged to scale said shunt sensor signal.

6. The method according to claim 5, further comprising a signal translator coupled to said signal intensifier, said signal translator arranged to map a first value of said shunt sensor signal to a second value.

7. The method according to claim 1, wherein said draw of current is detected by:
    detecting a first signal derived as a function of the draw of current from said power supply;
    transforming said first signal into a second signal, said second signal a scaled version of said first signal; and,
    translating said second signal into a third signal arranged to map a predetermined value of said second signal to a predetermined value of said third signal.

8. The method according to claim 7, further comprising:
    translating said second signal into a third signal based upon a first mapping prior to performing said zero set operation, and translating said second signal into a third signal based upon a second mapping subsequent to performing said zero set.

9. The method according to claim 1, wherein the motion of said electrode is monitored by a position sensor.

10. The method according to claim 1, wherein the motion of said electrode is monitored by:
    coupling said electrode to an actuator such that said electrode may selectively linearly transition at least a portion of a length of said actuator;
    coupling a drive device to said actuator such that said drive device causes linear motion of said electrode along said actuator, and,
    coupling an encoder to said drive device, said encoder having a first signal output that may be interpreted as position data.

11. The method according to claim 10, wherein said dither is detected by:
    advancing said electrode towards said workpiece by transitioning said electrode along said actuator in a first direction; and,
    using said encoder to detect motion of said electrode in a second direction opposite said first direction.

12. The method according to claim 1, wherein said machining operation further comprises:
    tracking a machined depth of said machining operation;

comparing said machined depth with said desired depth; and, retracting said electrode from said workpiece after said machined depth is at least said desired depth.

13. The method according to claim 1, wherein advancing said electrode towards said workpiece is defined by a closed loop system before performing said zero set operation, and performing said machining operation is defined by an open loop system.

14. A method of performing an electrical discharge machine operation comprising:

transitioning an electrode towards a workpiece;

detecting dither in the travel of said electrode;

performing a zero set operation if dither is detected in the travel of said electrode, otherwise, continuing to transition said electrode towards said workpiece; and, performing said machining operation after said zero set operation is performed.

15. The method according to claim 14, further comprising:

determining a desired depth of a machining operation prior to retracting said electrode.

16. The method according to claim 14, wherein the travel of said electrode is monitored by a position sensor.

17. The method according to claim 16, wherein the motion of said electrode is monitored by:

coupling said electrode to an actuator such that said electrode may selectively linearly transition at least a portion of a length of said actuator;

coupling a drive device to said actuator such that said drive device causes linear motion of said electrode along said actuator, and, coupling an encoder to said drive device, said encoder having a first signal output that may be interpreted as position data.

18. The method according to claim 17, wherein said dither is detected by:

advancing said electrode towards said workpiece by transitioning said electrode along said actuator in a first direction; and, using said encoder to detect motion of said electrode in a second direction opposite said first direction.

19. The method according to claim 14, wherein said machining operation further comprises:

tracking a machined depth of said machining operation;

comparing said machined depth with said desired depth; and, retracting said electrode from said workpiece after said machined depth is at least said desired depth.

20. The method according to claim 14, wherein advancing said electrode towards said workpiece is defined by an closed loop system before performing said zero set operation, and performing said machining operation is defined by an open loop system.

21. The method according to claim 14, further comprising:

monitoring a power supply coupled between said electrode and said workpiece to detect a draw of current from said power supply as a result of a spark between said electrode and said workpiece; and, performing said zero set operation only after detecting dither and detecting said draw of current.

22. An electrical discharge machine comprising:

a controller;

an actuator;

a drive device coupled to said actuator;

an electrode holder secured to said actuator arranged to selectively transition therealong, said electrode holder further arranged to receive and secure an electrode for unitary motion therewith;

a position sensor communicably coupled to at least one of said drive device and said actuator arranged to provide a position signal that may be interpreted to determine the position of said electrode holder along said actuator, said position signal communicably coupled to said controller;

a power supply arranged to be coupled between said electrode and a workpiece; and, a shunt sensor communicably coupled between said power supply and said controller, said shunt sensor arranged to detect a draw of current therein.

23. The electrical discharge machine according to claim 22, further comprising a signal intensifier coupled to said shunt sensor arranged to scale a shunt sensor output signal.

24. The electrical discharge machine according to claim 23, further comprising a signal translator coupled to said signal intensifier arranged to map said shunt sensor output signal to a value suitable for processing by said controller.

25. The electrical discharge machine according to claim 24, further comprising a first programmable logic controller communicably coupled between said signal translator and said controller arranged to communicably translate the mapped shunt sensor output signal to said controller.

26. The electrical discharge machine according to claim 22, further comprising a zero set control coupled to said controller arranged to allow selective adjustment of the gap spacing between said electrode and said workpiece.

27. The electrical discharge machine according to claim 26, further comprising a gap spacing control arranged to allow selective adjustment of the gap spacing between said electrode and said workpiece, wherein said controller is configured to interact with said zero set control to determine the proper gap spacing prior to performing a zero set operation, and said controller is further arranged to interact with said gap space control to determine the proper gap space subsequent to performing said zero set operation.

28. The electrical discharge machine according to claim 22, further comprising a second programmable logic controller communicably coupled between said position sensor and said controller, said second programmable logic controller arranged to communicably translate said position signal to said controller.

29. The electrical discharge machine according to claim 22, further comprising:

a primary dielectric flush arranged to channel dielectric fluid through a hollow portion of said electrode; and, an auxiliary flush arranged to channel dielectric fluid from said electrical discharge machine generally towards said workpiece.

30. The electrical discharge machine according to claim 29, wherein said auxiliary flush is configured to channel dielectric fluid generally parallel to said electrode proximate the circumference of said electrode and towards said workpiece.

31. An electrical discharge machine having an auxiliary flush system comprising:

a table on a base for supporting a workpiece;

a column extending from said base;

a head unit coupled to said column, said head unit repositionable along said column;

an actuator mounted to said head unit, said actuator adapted to support a hollow electrode for linear motion with respect thereto;

an electrode guide having:
- a first end portion and a second end portion, said second end portion fixedly mounted to said actuator;
- a first through aperture arranged to receive said electrode therethrough;
- a channel within said electrode guide that couples a dielectric fluid provided by a dielectric fluid delivery system from said second end portion towards said first end portion; and
- a plurality of flush apertures in communication with said channel, said flush apertures positioned proximate to said first aperture and are arranged so as to direct said dielectric fluid provided through said channel in said electrode guide towards a machining gap in said workpiece.

32. The electrical discharge machine according to claim 31, wherein said dielectric fluid is directed generally parallel to said electrode in proximate relationship thereto in a manner so as to form a fluid bearing during electrical discharge machine operations.

33. The electrical discharge machine according to claim 31 further comprising a guide extension coupled to said electrode guide generally coaxial with said first aperture, said guide extension arranged to receive said electrode therethrough.

34. The electrical discharge machine according to claim 31, wherein said plurality of flush apertures are arrayed generally about said first aperture, each of said plurality of flush apertures in communication with said channel within said electrode guide.

35. The electrical discharge machine according to claim 34, wherein said plurality of flush apertures are spaced in a generally annular ring about said first aperture.

* * * * *